June 17, 1958   J. KRAUTKRÄMER ET AL   2,838,930
DEVICE FOR NON-DESTRUCTIVE TESTING OF MATERIALS
BY MEANS OF SUPERSONIC PULSES
Filed Nov. 10, 1955
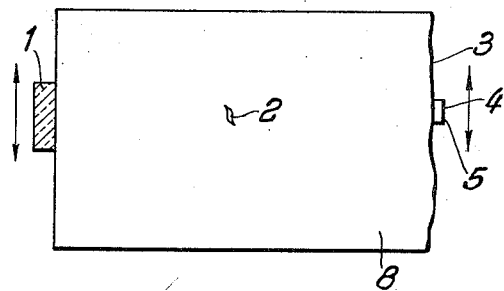
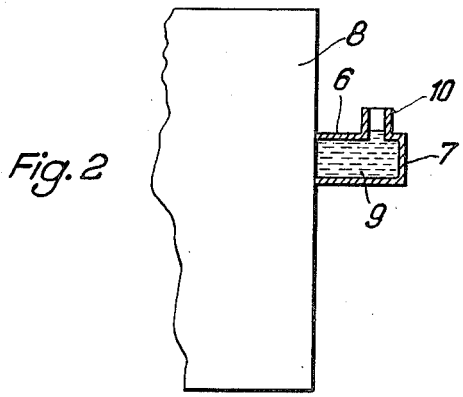

United States Patent Office 2,838,930
Patented June 17, 1958

2,838,930

DEVICE FOR NON-DESTRUCTIVE TESTING OF MATERIALS BY MEANS OF SUPERSONIC PULSES

Josef Krautkrämer and Herbert Krautkrämer, Koln-Lindenthal, Germany assignors to Sperry Products Inc., Danbury, Conn.

Application November 10, 1955, Serial No. 546,204

1 Claim. (Cl. 73—67.8)

This invention relates to a supersonic impulse reflection device for the non-destructive testing of materials.

The known methods for non-destructive testing of materials by the supersonic impulse reflection method enable a sufficiently accurate localization of faults (cracks, contraction cavities) but do not permit, in general, of a conclusion regarding the size of the faults. For this reason it is attempted in practice to estimate the size of the fault from empirical knowledge. Such estimates are inadequate since the size of the reflected echo bears a complex relation to the intensity of the radiated sound and the propagation conditions. An important part in determining the size of the reflected echo is played also by the coupling conditions, surface roughness and sound hardness.

It might be attempted to use the echo from the rear face as a reference echo to be compared with the fault echo. In most practical applications this is not possible, however, for reasons of principle, because for the supersonic frequencies employed the faults are in general only scattering reflectors where no regular beam reflection but only a diffusion of the impinging supersonic waves occurs. Thus the flows constitute secondary radiators, which emit spherical waves, whereas a regular beam reflection occurs at the rear face. The intensity of the energies reflected at the fault and at the rear face, respectively, is governed by different distance laws; this means that the decay of the reflected energy related to the distance follows different laws so that the two echoes cannot be usefully compared. This fact can easily be confirmed quantitatively: If the fault and rear face are in the remote radiation field of the supersonic quartz, i. e., at a distance L from the quartz which exceeds $$L = \frac{D^2}{4\lambda}$$

wherein D is the diameter of the quartz and λ the wavelength of sound in the test specimen, the sound pressure P will decay in proportion with the distance r from the quartz:

$$P \sim \frac{1}{r}$$

This distance law governs also the reflection on the rear face. On the other hand, if the sound wave meets a fault, which may be small compared to the wavelength of sound in the test specimen, the fault will act as a secondary radiator emitting a scattered wave, whose pressure amplitude P' decays according to the known $$\frac{1}{r}$$

relation and is proportional to the sound pressure P of the primary wave; since that sound pressure decays in the remote radiation field also as $$\frac{1}{r}$$

the fault echo P' will be determined by the relation $$P' \sim \frac{1}{r^2}$$

The foregoing formula is derived as follows: The sound pressure P on the axis of the radiating crystal measured at the distance r is proportional to $$\frac{1}{r}$$

The excited oscillating amplitude of a small scattering reflector is proportional to the sound pressure at this position. Therefore if the scattering reflector lies at the distance r on the axis of the crystal, its oscillation amplitude is proportional to P, and thus to $$\frac{1}{r}$$

If we now measure the sound pressure P' of the scattered wave at a distance r', it is also proportional to $$\frac{1}{r'}$$

and at the same time is proportional to the oscillation amplitude, which itself was proportional to $$\frac{1}{r} \cdot P'$$

therefore equals $$\frac{1}{r} \cdot \frac{1}{r'}$$

If we measure the scattered sound pressure at the position of the emitting crystal, r=r'. Therefore the crystal, working as receiver will pick up the scattered sound pressure P' proportional $$\frac{1}{r^2}$$

The height of the echo on the cathode ray tube is therefore proportional to $$\frac{1}{r^2}$$

because the crystal is a receiver for sound pressure, not for sound intensity.

According to the invention this difficulty is removed so that at least one reference echo to be compared with the fault echo is produced by means of a scattering reflection set-up coupled to the workpiece to be tested, in order to enable the size of the fault to be determined.

The invention is illustrated with reference to several embodiments.

Fig. 1 is a diagrammatic view embodying an application of the invention.

Fig. 2 shows a specific construction of a reflector according to the invention.

According to Fig. 1 the sound emitted by the quartz crystal 1 into the workpiece to be tested first meets the fault 2, then the rear face 3. The resulting echoes are registered at correspondingly spaced points on the time scale of the cathode ray oscillograph. The reflector 4, e. g. a Plexiglas disk, is coupled by a coupling liquid to the rear face 3. If the boundary face 5 of the Plexiglas disc is small enough it will constitute a scattering reflector so that the fault echo and the echo produced by the reflector according to the invention—the latter echo is registered behind the rear face echo on the time axis of the cathode ray oscillograph—follow the same distance laws for the reflected energy. As is indicated by arrows the quartz and the scattering reflector disk may be moved in a suitable manner along the workpiece to scan the same for faults.

Fig. 2 shows another construction of the reflecting means according to the invention. The scattering reflector consists of a small container 6, whose outer wall 7 (e. g. of rubber) can be resiliently urged against the workpiece 8. The hollow space 9 can be filled with coupling liquid through an inlet conduit 10.

According to the invention the scattering reflector may be made from a plastic material which will readily conform to the irregularities of the rear face. Where solid reflectors are used it is desirable that the coupling liquid should have substantially the same acoustic impedance as the reflector. Methylene iodide is a suitable coupling liquid for use with Plexiglas reflectors. In many cases the reflector material and coupling liquid can be selected to have substantially the same acoustic impedance as the workpiece.

Even if the faults are of such a size that they cannot be considered as scattering reflectors, the reflection set-up according to the invention proves of advantage in many cases. If a regular beam reflection occurs at the fault, care must be taken only that the reflector is of sufficient size to give not only a scattering reflection but also a regular reflection, because otherwise the sound energies reflected by the fault and reflector would follow different distance laws.

What is claimed is:

An apparatus for the non-destructive testing of materials, comprising means for transmitting a supersonic ray into a workpiece to be tested whereby a fault within the material which is small relative to the area of the back surface will cause a scattering reflection which is a function of the size of the fault, the back surface causing a beam reflection, and a reflector of predetermined area engaging the back surface of the material, said reflector also being small relative to the area of the back surface so that a scattered reflection will be set up which is a function of the area of the reflector, whereby the size of the fault may be compared to the size of the reflector.

References Cited in the file of this patent
UNITED STATES PATENTS 2,592,135     Firestone _____ Apr. 8, 1952

FOREIGN PATENTS 685,275     Great Britain _____ Dec. 31, 1952